US009554289B2

(12) United States Patent
Zhang et al.

(10) Patent No.: US 9,554,289 B2
(45) Date of Patent: Jan. 24, 2017

(54) MANAGEMENT METHOD, APPARATUS, AND SYSTEM FOR COVERAGE OPTIMIZATION

(71) Applicant: Huawei Technologies Co., Ltd., Shenzhen (CN)

(72) Inventors: Kai Zhang, Shanghai (CN); Xiaoli Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 14/144,212

(22) Filed: Dec. 30, 2013

(65) Prior Publication Data

US 2014/0113638 A1 Apr. 24, 2014

Related U.S. Application Data

(63) Continuation of application No. PCT/CN2012/079369, filed on Jul. 30, 2012.

(30) Foreign Application Priority Data

Jul. 28, 2011 (CN) .......................... 2011 1 0213730

(51) Int. Cl.

| | |
|---|---|
| *H04W 40/00* | (2009.01) |
| *H04W 24/02* | (2009.01) |
| *H04W 16/18* | (2009.01) |
| *H04W 16/22* | (2009.01) |
| *H04W 16/26* | (2009.01) |
| *H04W 24/04* | (2009.01) |
| *H04W 24/10* | (2009.01) |
| *H04W 52/24* | (2009.01) |

(52) U.S. Cl.
CPC ............ *H04W 24/02* (2013.01); *H04W 16/18* (2013.01); *H04W 16/22* (2013.01); *H04W 16/26* (2013.01);

(Continued)

(58) Field of Classification Search
CPC ...... H04W 24/02; H04W 24/10; H04W 24/08; H04W 16/18; H04W 24/04; H04W 16/26; H04W 16/22

(Continued)

(56) References Cited

U.S. PATENT DOCUMENTS

| | | | |
|---|---|---|---|
| 6,456,652 B1 | 9/2002 | Kim et al. | |
| 7,768,968 B2 * | 8/2010 | Plehn ................... | H04W 16/18 370/329 |

(Continued)

FOREIGN PATENT DOCUMENTS

| | | |
|---|---|---|
| CN | 101790173 A | 7/2010 |
| CN | 102083119 A | 6/2011 |

(Continued)

OTHER PUBLICATIONS

"3rd Generation Partnership Project; Technical Specification Group Services and System Aspects; Telecommunication management; Configuration Management (CM); Generic network resources Integration Reference Point (IRP); Network Resource Model (NRM) (Release 10)," 3GPP TS 32.622 v10.0.0, Mar. 2011, 28 pages.

(Continued)

*Primary Examiner* — Vladimir Magloire
*Assistant Examiner* — Jaime Holliday
(74) *Attorney, Agent, or Firm* — Slater Matsil, LLP (57) ABSTRACT

Embodiments of the present invention disclose a management method, apparatus, and system for coverage optimization. The method includes obtaining measurement reports of a coverage optimization target region, and determining an actual value of a coverage optimization target within the coverage optimization target region according to the measurement reports. Coverage optimization processing is performed on the coverage optimization target region when the actual value of the coverage optimization target is smaller (Continued)

than a preset expected value of the coverage optimization target. According to the embodiments of the present invention, automatic determination is implemented to determine whether the coverage optimization processing needs to be performed on the coverage optimization target region, thereby improving management efficiency of coverage optimization.

17 Claims, 4 Drawing Sheets

(52) U.S. Cl.
CPC ............ *H04W 24/04* (2013.01); *H04W 24/10* (2013.01); *H04W 52/241* (2013.01)

(58) Field of Classification Search
USPC ............... 370/252; 455/422.1, 423, 424, 446
See application file for complete search history.

(56) References Cited

U.S. PATENT DOCUMENTS

| | | | | |
|---|---|---|---|---|
| 2007/0022191 A1* | 1/2007 | Miao | ................... | H04L 41/0803 709/223 |
| 2009/0310501 A1 | 12/2009 | Catovic et al. | | |
| 2011/0212720 A1* | 9/2011 | Hamalainen | .......... | H04W 24/02 455/423 |
| 2012/0039166 A1* | 2/2012 | Gao | ....................... | H04W 24/02 370/221 |
| 2013/0005297 A1* | 1/2013 | Sanders | ................ | G01S 13/765 455/406 |
| 2014/0295846 A1 | 10/2014 | Ashraf et al. | | |

FOREIGN PATENT DOCUMENTS

| | | |
|---|---|---|
| CN | 102104904 A | 6/2011 |
| EP | 2259616 A1 | 12/2010 |
| JP | 2012525097 A | 10/2012 |
| JP | 2013504906 A | 2/2013 |
| WO | 2009003260 A1 | 1/2009 |
| WO | 2009119393 A1 | 10/2009 |
| WO | 2009152097 A1 | 12/2009 |
| WO | 2010124501 A1 | 4/2010 |
| WO | 2011029497 A1 | 3/2011 |
| WO | 2011082826 A1 | 7/2011 |

OTHER PUBLICATIONS

Chinese International Search Report, Application No. PCT/CN2012/079369, date Nov. 22, 2012, 13 pages.

\* cited by examiner

MANAGEMENT METHOD, APPARATUS, AND SYSTEM FOR COVERAGE OPTIMIZATION

This application is a continuation of International Application No. PCT/CN2012/079369, filed on Jul. 30, 2012, which claims priority to Chinese Patent Application No. 201110213730.6, filed on Jul. 28, 2011, both of which are hereby incorporated by reference in their entireties.

TECHNICAL FIELD

The present invention relates to the field of network management technologies, and in particular to a management method, apparatus, and system for coverage optimization.

BACKGROUND

Generally, in network coverage, base station distribution and cell configuration are planned by using a plan tool at an initial stage of network planning, and manual adjustment is performed by using a network optimization tool during a network operation process.

During a practical application process, if a call drop rate of a certain region is high, network management personnel determine that a network coverage exception might occur. For example, the region is a network coverage hole. Therefore, the network management personnel perform coverage optimization processing on the network in this region, for example, use the network optimization tool to change an antenna direction, adjust antenna transmit power, and the like.

In the prior art, the network management personnel manually determine whether network coverage optimization needs to be performed, which needs consumption of a large quantity of manpower and materials, and may result in problems such as delayed or inaccurate coverage optimization processing. Therefore, management efficiency of the coverage optimization is relatively low.

SUMMARY OF THE INVENTION

Embodiments of the present invention provide a management method, apparatus, and system for coverage optimization to improve management efficiency of the coverage optimization.

In one aspect, the present invention provides a management method for coverage optimization, including obtaining measurement reports of a coverage optimization target region, and determining an actual value of a coverage optimization target within the coverage optimization target region according to the measurement reports. Coverage optimization processing is performed on the coverage optimization target region when the actual value of the coverage optimization target is smaller than a preset expected value of the coverage optimization target.

In another aspect, the present invention further provides a management apparatus for coverage optimization, including an obtaining module configured to obtain measurement reports of a coverage optimization target region, and an actual value determining module configured to determine an actual value of a coverage optimization target within the coverage optimization target region according to the measurement reports. A coverage optimization processing module is configured to perform coverage optimization processing on the coverage optimization target region when the actual value of the coverage optimization target is smaller than a preset expected value of the coverage optimization target.

In still another aspect, the present invention further provides a management system for coverage optimization, including the foregoing management apparatus for coverage optimization.

According to the management method, apparatus, and system for coverage optimization provided in the embodiments of the present invention, the actual value of the coverage optimization target within the coverage optimization target region is determined according to the measurement reports of the coverage optimization target region, the actual value of the coverage optimization target is compared with the expected value of the coverage optimization target, and whether the coverage optimization processing needs to be performed on the coverage optimization target region is determined according to the comparison result. As may be seen here, in the embodiments of the present invention, automatic determination that whether the coverage optimization processing needs to be performed on the coverage optimization target region is implemented. This facilitates improvement of determination timeliness and accuracy, thereby improving the management efficiency of the coverage optimization.

BRIEF DESCRIPTION OF THE DRAWINGS

For a more complete understanding of the present invention, and the advantages thereof, reference is now made to the following descriptions taken in conjunction with the accompanying drawings, in which.

To illustrate the technical solutions in the embodiments of the present invention or in the prior art more clearly, the following briefly describes accompanying drawings required for describing the embodiments or the prior art. Apparently, the accompanying drawings in the following description are merely some embodiments of the present invention, and persons of ordinary skill in the art may obtain other accompanying drawings from these accompanying drawings without making creative efforts.

DETAILED DESCRIPTION OF ILLUSTRATIVE EMBODIMENTS

To make the objectives, technical solutions, and advantages of the present invention more clear, the following clearly and completely describes the technical solutions according to the embodiments of the present invention with reference to the accompanying drawings in the embodiments of the present invention. Apparently, the embodiments in the following description are merely part of rather than all of the embodiments of the present invention. All other embodiments obtained by persons of ordinary skill in the art based on the embodiments of the present invention without making creative efforts shall fall within the protection scope of the present invention.

The sequence numbers in the embodiments of the present invention below are merely for description, and do not imply preference among the embodiments.

Figure 1:
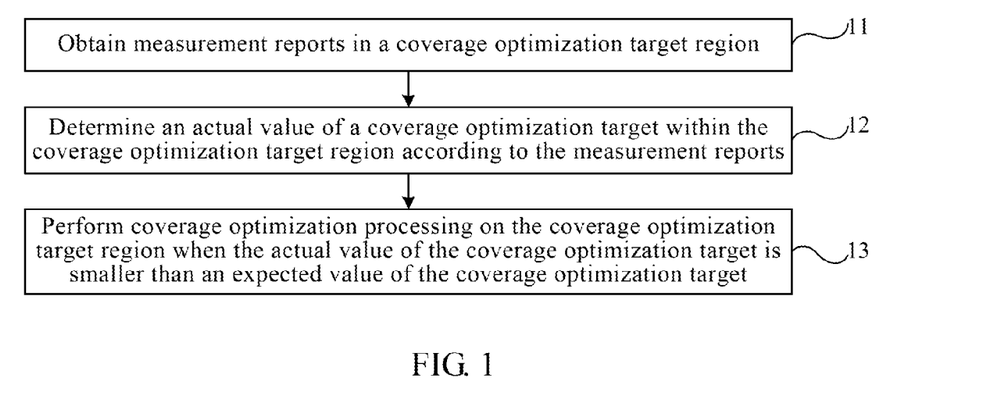
FIG. 1 is a flow chart of a management method for coverage optimization according to a first embodiment of the present invention.

FIG. 1 is a flow chart of a management method for coverage optimization according to a first embodiment of the present invention. An executing subject of this embodiment is a management apparatus for coverage optimization. The apparatus may be presented as but not limited to: a network management system (NMS), an element management system (EMS), a base station, another network element device except the base station, or the like. The method shown in FIG. 1 includes the following content.

11. Obtain measurement reports of a coverage optimization target region.

Optionally, the coverage optimization target region may be determined in advance according to an actual need. Specifically, a manner for determining the coverage optimization target region and an expected value of a coverage optimization target may include but is not limited to: determining the coverage optimization target region and the expected value of the coverage optimization target according to a received northbound or southbound network management interface command message; or determining the coverage optimization target region and the expected value of the coverage optimization target according to a configuration parameter related to coverage optimization in a network resource model.

The foregoing coverage optimization target region may include but is not limited to: a cell, a coverage region of a base station, a coverage region of a base station controller, a coverage region of a subnetwork, or the like. The subnetwork in this embodiment refers to a series of managed entities via the northbound interface for a management need. For details, reference may be made to the content in section 6.1.3.7 in the TS32.622 V10.0.0 protocol of the 3rd generation partnership project (3GPP).

12. Determine an actual value of the coverage optimization target within the coverage optimization target region according to the measurement reports.

The measurement reports may include but are not limited to: minimization of drive test (MDT) reports, or radio link failure (RLF) measurement reports.

The MDT measurement report may be reported by a terminal (also called a user equipment, User Equipment, abbreviated as UE) periodically or in real time; the RLF measurement report may be reported when a radio link failure occurs in the terminal. Alternatively, the MDT measurement report and/or the RLF measurement report may be obtained through measurement by the management apparatus for coverage optimization, such as a base station and the like.

The measurement reports may include: a measurement value of a DL quality parameter and location information of measurement thereof, such as a DL RSRP and/or DL RSRQ measurement value and location information of the measurement, or a DL RSCP and/or DL RSRQ measurement value and location information of measurement thereof. The management apparatus for coverage optimization obtains the measurement reports of the coverage optimization target region, and calculates the actual value of the coverage optimization target according to a measurement value of a downlink quality parameter in the measurement reports.

Alternatively, the measurement reports may include: a measurement value of an uplink (UL) quality parameter and location information of measurement thereof, such as a UL RSRP and/or UL RSRQ measurement value and location information of measurement thereof, or a UL RSCP and/or UL RSRQ measurement value and location information of measurement thereof. The management apparatus for coverage optimization obtains the measurement reports of the coverage optimization target region, and calculates the actual value of the coverage optimization target based on the measurement value of the uplink quality parameter in the measurement reports.

13. Perform coverage optimization processing on the coverage optimization target region when the actual value of the coverage optimization target is smaller than the preset expected value of the coverage optimization target.

The expected value of the coverage optimization target reflects a coverage optimization requirement that is expected to be met and may be preset according to an actual need. The coverage optimization target may include but is not limited to: a coverage area ratio and/or a coverage measurement data number ratio. The coverage area ratio is a ratio of a region area sum of regions within the coverage optimization target region to a total area of the coverage optimization target region, where a statistical average value of a downlink quality parameter of each of the regions reaches a preset threshold; and the coverage measurement data number ratio is a ratio of a total number of measurement data, in each of which the statistical average value of the downlink quality parameter reaches the preset threshold, within the coverage optimization target region, to a total measurement data number of the measurement parameter within the coverage optimization target region.

In different communication systems, a specific name of the downlink (DL) quality parameter may be different. For example, in an LTE system, the DL quality parameter may include but is not limited to: DL reference signal received power (RSRP), and/or, DL reference signal received quality (RSRQ), and/or, a DL signal to interference and noise ratio (SINR); in a UMTS system, the DL quality parameter may include but is not limited to: DL received signal code power (RSCP), and/or, a DL received signal chip signal-to-noise ratio (also called "Ec/Io"), and the like.

Specific content of the coverage optimization processing performed on the coverage optimization target region is not limited. For example, the antenna direction, transmit power of the coverage optimization target region and the like may be adjusted. In addition, a specific manner for performing the coverage optimization processing on the coverage optimization target region is not limited. For example, an adjustment may be performed manually, or a network may automatically perform an optimization adjustment on, for example, an electric tilt antenna and the like.

Optionally, if the actual value of the coverage optimization target is greater than or equal to the preset expected value of the coverage optimization target, the coverage optimization processing may not be performed on the coverage optimization target region.

According to the management method for coverage optimization provided in this embodiment, the actual value of the coverage optimization target within the coverage optimization target region is determined according to the measurement reports of the coverage optimization target region, the actual value of the coverage optimization target is compared with the expected value of the coverage optimization target, and whether the coverage optimization processing needs to be performed on the coverage optimization target region is determined according to the comparison result. As may be seen here, in this embodiment, automatic determination that whether the coverage optimization processing needs to be performed on the coverage optimization target region is implemented. This facilitates improvement of determination timeliness and accuracy, thereby improving management efficiency of coverage optimization.

Figure 2:
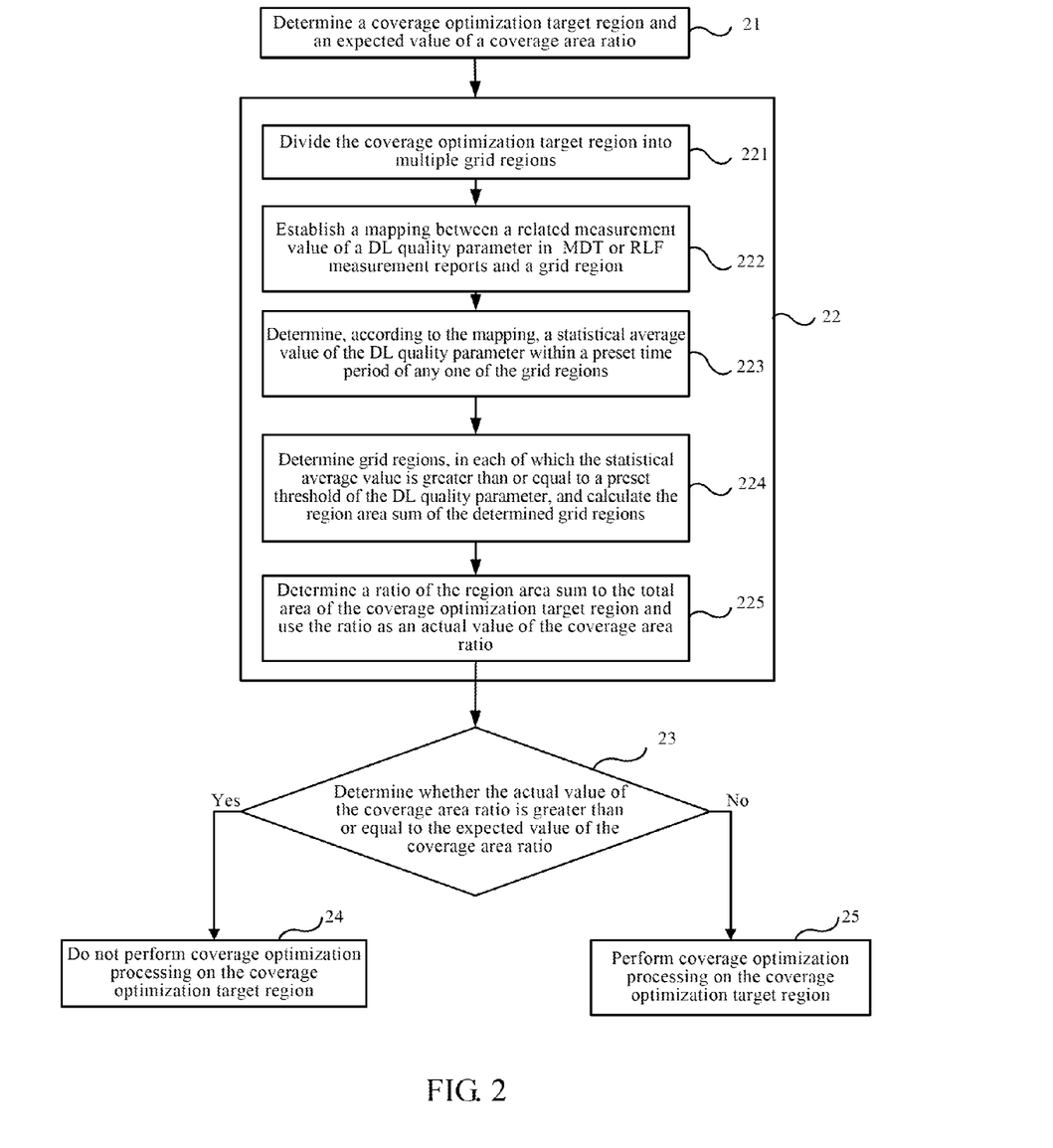
FIG. 2 is a flow chart of a management method for coverage optimization according to a second embodiment of the present invention.

FIG. 2 is a flow chart of a management method for coverage optimization according to a second embodiment of the present invention. This embodiment describes the technical solution of the management method for coverage optimization in detail by taking a downlink as an example and using a coverage area ratio as a coverage optimization target. The method shown in FIG. 2 includes the following content.

21. Determine a coverage optimization target region and an expected value of a coverage area ratio.

Optionally, a management apparatus for configuration optimization may determine the coverage optimization target region and an expected value of a coverage optimization target according to a northbound network management interface command message sent by a network management system (NMS) or a southbound network management interface command message sent by an element management system (EMS). For example, the coverage optimization target region is determined as a cell A, the coverage optimization target is determined as the coverage area ratio, and the expected value of the coverage area ratio is determined. The format of the northbound or southbound network management interface command message is, for example, {expected value of the coverage area ratio, cell information}. The "cell information" may be list information that includes at least one cell identity, such as list information that includes a cell global identifier (CGI), and the like.

Or, optionally, the management apparatus for configuration optimization may determine the coverage optimization target region and the expected value of the configuration optimization target according to a configuration parameter related to coverage optimization in a network resource model. For example, the coverage optimization target region is determined as a cell A, the coverage optimization target is determined as the coverage area ratio, and the expected value of the coverage area ratio is determined. The network resource model may include: an "RncFunction" resource model, an "EUtranGenericCell" resource model, or the like. The configuration parameter related to coverage optimization in the network resource model may be modified by the NMS or EMS.

22. Obtain MDT or RLF measurement reports of the coverage optimization target region and determine an actual value of the coverage area ratio according to the measurement reports. Then, execute 23.

Optionally, step 22 may further include 221-225.

221. Divide the coverage optimization target region into multiple grid regions.

Division granularity of the grid regions may be determined according to an actual calculation precision requirement. The finer the division granularity of the grid regions is, the higher the calculation precision is.

222. Establish a mapping between a related measurement value of a DL quality parameter in the MDT or RLF measurement reports and a grid region.

The MDT or RLF measurement reports may include: the measurement value of the DL quality parameter and location information of measurement thereof, such as a measurement value of DL RSRP and location information of measurement thereof, or a measurement value of DL RSCP and location information of measurement thereof. An association, that is, the mapping between the measurement value of the DL quality parameter and the grid region, may be established according to the location information.

Alternatively, the MDT or RLF measurement reports include: the related measurement value of the DL quality parameter and location information of measurement thereof, that is, a measurement value of the DL quality parameter determination factor and location information of measurement thereof. For example, the DL quality parameter is DL SINR, and a DL SINR determination factor is DL RSRQ. The MDT measurement reports include a measurement value of the DL RSRQ and location information of measurement thereof, where a value of the DL SINR equals a ratio of reference signal received power of a local serving cell to the sum of received power of neighboring cell signals to the local serving cell (relative to total downlink interference of the local serving cell) and noise power; a value of the RSRQ equals a ratio of the reference signal received power of the local serving cell to the sum of the received power of the neighboring cell signals to the local serving cell (relative to the total downlink interference of the local serving cell), noise power, and the received power of the local serving cell. The DL SINR may be obtained through calculation according to the RSRQ. For another example, the DL quality parameter is DL Ec/Io, and a DL Ec/Io determination factor is DL RSRQ. The MDT measurement reports include a measurement value of the DL RSRQ and location information of measurement thereof. The method for calculating DL Ec/Io is similar to the foregoing method for calculating the value of the DL SINR, which is not repeatedly described here.

223. Determine, according to the mapping, a statistical average value of the DL quality parameter within a preset time period of any one of the grid regions.

To improve reliability of the calculation result, a measurement time period, that is, the preset time period in this embodiment, may be determined in advance. The measurement reports within the time period are obtained, and the mapping between the measurement value of the DL link quality parameter of the cell A in each measurement report and the grid region is established through step 222. Then, the statistical average value of the DL quality parameter within the time period of any one of the grid regions is calculated.

224. Determine grid regions, in each of which the statistical average value is greater than or equal to a preset threshold of the DL quality parameter, and calculate the region area sum of the determined grid regions.

After the statistical average value of the DL quality parameter of any one of the grid regions is obtained through calculation, the statistical average value of any one of the grid regions is compared with the preset threshold of the DL quality parameter. The grid regions, in each of which the statistical average value meets the requirement, are determined according to the comparison result, that is, the grid regions, in each of which the statistical average value is greater than or equal to the preset threshold of the DL quality parameter, are determined. The region area sum of the grid regions, in each of which the statistical average value meets the requirement, is calculated.

225. Determine a ratio of the region area sum to the total area of the coverage optimization target region and use the ratio as the actual value of the coverage area ratio.

For example, the region area sum of the grid regions, in each of which the statistical average value meets the requirement, is divided by the total area of the cell A. An obtained quotient is the actual value of the coverage area ratio.

If the DL quality parameter is the DL RSRP, a DL RSRP coverage area ratio equals a ratio of the region area sum of the grid regions, in each of which the statistical average value of the RSRP is greater than or equal to a preset threshold of the RSRP, to the total area of the coverage optimization target region. Optionally, related information may be recorded in a 2-tuple manner, for example, {coverage area ratio, RSRP threshold}, where the "coverage area ratio" is a percentage ranging from 0 to 1, and the unit of the "RSRP threshold" is "dBm".

If the DL quality parameter is the DL RSCP, a DL RSCP coverage area ratio equals a ratio of the region area sum of the grid regions, in each of which the statistical average value of the RSCP is greater than or equal to a preset threshold of the RSCP, to the total area of the coverage optimization target region. Optionally, related information may be recorded in a 2-tuple manner, for example, {coverage area ratio, RSCP threshold}, where the "coverage area ratio" is a percentage ranging from 0 to 1, and the unit of the "RSCP threshold" is "dBm".

If the DL quality parameter is the DL SINR, a DL SINR coverage area ratio equals a ratio of the region area sum of the grid regions, in each of which the statistical average value of the SINR of a downlink reference signal is greater than or equal to a preset threshold of the SINR, to the total area of the coverage optimization target region. Optionally, related information may be recorded in a 2-tuple manner, for example, {coverage area ratio, SINR threshold}, where the "coverage area ratio" is a percentage ranging from 0 to 1, and the unit of the "SINR threshold" is "dB".

If the DL quality parameter is the DL Ec/Io, a DL Ec/Io coverage area ratio equals a ratio of the region area sum of the grid regions, in each of which the statistical average value of the Ec/Io of a downlink reference signal is greater than or equal to a preset threshold of the Ec/Io, to the total area of the coverage optimization target region. Optionally, related information may be recorded in a 2-tuple manner, for example, {coverage area ratio, Ec/Io threshold}, where the "coverage area ratio" is a percentage ranging from 0 to 1, and the unit of the "Ec/Io threshold" is "dB".

23. Determine whether the actual value of the coverage area ratio is greater than or equal to the expected value of the coverage area ratio. If yes, execute 24; otherwise, execute 25.

24. Do not perform coverage optimization processing on the coverage optimization target region.

If the actual value of the coverage area ratio is greater than or equal to the expected value of the coverage area ratio, it indicates that the coverage optimization target region meets the coverage optimization requirement that is expected to be met. Therefore, the coverage optimization processing may not be performed on the coverage optimization target region.

25. Perform coverage optimization processing on the coverage optimization target region.

If the actual value of the coverage area ratio is smaller than the expected value of the coverage area ratio, it indicates that the coverage optimization target region does not meet the coverage optimization requirement that is expected to be met. Therefore, the coverage optimization processing needs to be performed on the coverage optimization target region.

Specific content of the coverage optimization processing performed on the coverage optimization target region is not limited. For example, an antenna direction, transmit power of the coverage optimization target region and the like may be adjusted. In addition, a specific manner for performing the coverage optimization processing on the coverage optimization target region is not limited. For example, an adjustment may be performed manually, or a network may automatically perform optimization, and the like.

According to the management method for coverage optimization provided in this embodiment, the actual value of the coverage area ratio within the coverage optimization target region is determined according to the MDT or RLF measurement reports of the coverage optimization target region, the actual value of the coverage area ratio is compared with the expected value of the coverage area ratio, and whether the coverage optimization processing needs to be performed on the coverage optimization target region is determined according to the comparison result. As may be seen here, in this embodiment, automatic determination that whether the coverage optimization processing needs to be performed on the coverage optimization target region is implemented. This facilitates improvement of determination timeliness and accuracy, thereby improving management efficiency of coverage optimization.

Besides that coverage optimization management may be performed on the downlink, similarly, the coverage optimization management may be performed on an uplink. Specifically, an implementation method for the coverage optimization management in the uplink, where the coverage area ratio is used as the coverage optimization target, is similar to the management method for coverage optimization in the downlink. A difference lies in that an uplink quality parameter may accordingly include one or any combination of the following: UL RSRP, UL SINR, UL RSCP, and UL Ec/Io. The management method for coverage optimization in the uplink is not repeatedly described here.

Figure 3:
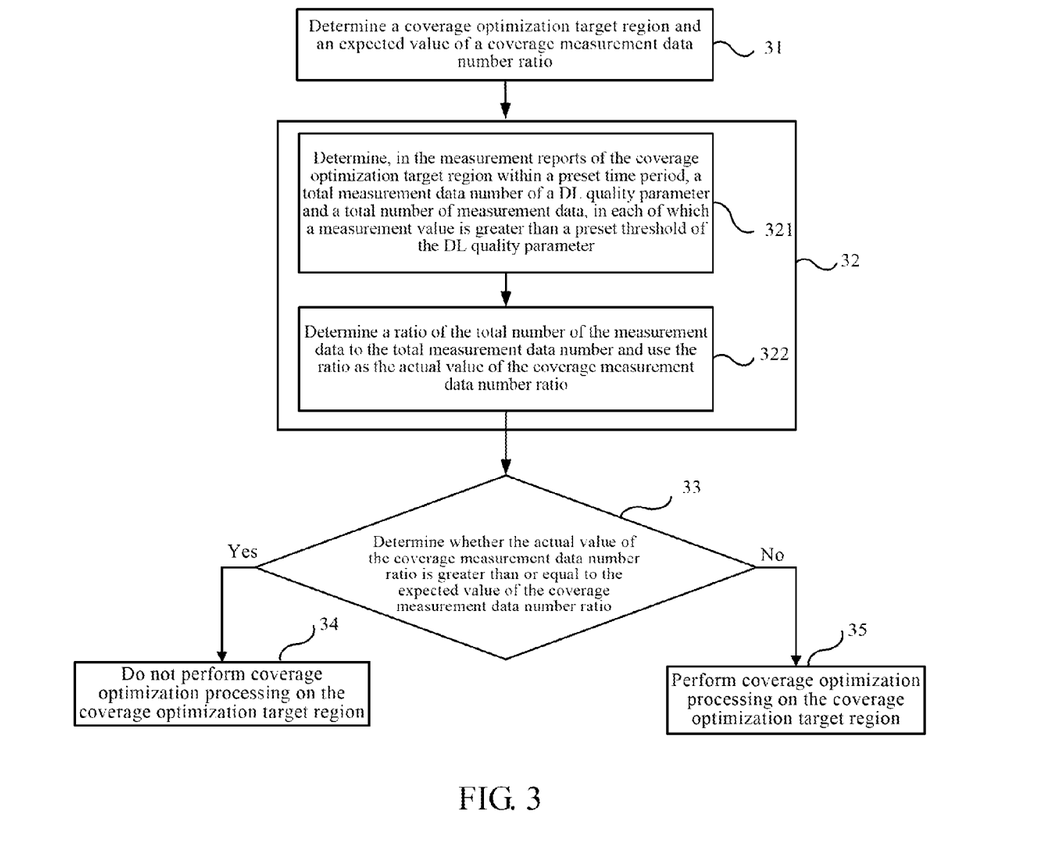
FIG. 3 is a flow chart of a management method for coverage optimization according to a third embodiment of the present invention.

FIG. 3 is a flow chart of a management method for coverage optimization according to a third embodiment of the present invention. A difference between this embodiment and the embodiment corresponding to FIG. 2 lies in that this embodiment describes the technical solution of the management method for coverage optimization in detail by using a coverage measurement data number ratio as a coverage optimization target. The method shown in FIG. 3 includes the foregoing content.

31. Determine a coverage optimization target region and an expected value of a coverage measurement data number ratio.

Optionally, a management apparatus for configuration optimization may determine the coverage optimization target region and an expected value of a coverage optimization target according to a northbound network management interface command message sent by an NMS or a southbound network management interface command message sent by an EMS. For example, the coverage optimization target region is determined as a cell A, the coverage optimization target is determined as the coverage measurement data number ratio, and the expected value of the coverage measurement data number ratio is determined. The format of the northbound or southbound network management interface command message is, for example, {expected value of the coverage measurement data number ratio, cell information}. The "cell information" may be list information that includes at least one cell identity, such as a CGI and the like.

Or, optionally, the management apparatus for configuration optimization may determine the coverage optimization target region and the expected value of the configuration optimization target according to a configuration parameter related to coverage optimization in a network resource model. For example, the coverage optimization target region is determined as a cell A, the coverage optimization target is determined as the coverage measurement data number ratio, and the expected value of the coverage measurement data number ratio is determined. The network resource model may include: an "RncFunction" resource model, an "EUtranGenericCell" resource model, or the like. The configuration parameter related to coverage optimization in the network resource model may be modified by the NMS or EMS.

32. Obtain MDT or RLF reports of the coverage optimization target region, and determine an actual value of the coverage measurement data number ratio according to the measurement reports. Execute 33.

Optionally, step 32 may further include 321 and 322.

321. Determine, in the measurement reports of the coverage optimization target region within a preset time period, a total measurement data number of a DL quality parameter and a total number of measurement data, in each of which a measurement value is greater than a preset threshold of the DL quality parameter.

To improve reliability of a calculation result, a measurement time period, that is, the preset time period in this embodiment, may be determined in advance.

The measurement reports within the time period is obtained and the total measurement data number of the DL quality parameter within the coverage optimization target region in the obtained measurement reports within the time period is counted.

In addition, the measurement value of the DL quality parameter within the coverage optimization target region in the obtained measurement reports within the time period is compared with the preset threshold of the DL quality parameter. If the measurement value of the DL quality parameter is greater than or equal to the preset threshold of the DL quality parameter, it indicates that the measurement value is fulfilled measurement data. The total number of the fulfilled measurement data within the time period is counted. That is, the total number of the measurement data according to this embodiment is counted.

322. Determine a ratio of the total number of the measurement data to the total measurement data number and use the ratio as the actual value of the coverage measurement data number ratio.

The total number of the measurement data of the fulfilled measurement data obtained by statistic counting is divided by the total measurement data number of the DL quality parameter within the coverage optimization target region in the obtained measurement reports within the time period. An obtained quotient is the actual value of the coverage measurement data number ratio.

If the DL quality parameter is DL RSRP, the coverage measurement data number ratio of the DL RSRP equals a ratio of the total number of the measurement data, where a measurement value of the RSRP is greater than or equal to a preset threshold of the RSRP, to the total number of the measurement data of the RSRP within the coverage optimization target region. Optionally, related information may be recorded in a 2-tuple manner, for example, {coverage measurement data number ratio, RSRP threshold}, where the "coverage measurement data number ratio" is a percentage ranging from 0 to 1, and the unit of the "RSRP threshold" is "dBm".

If the DL quality parameter is DL RSCP, the coverage measurement data number ratio of the DL RSCP equals a ratio of the total number of the measurement data, where a measurement value of the RSCP is greater than or equal to a preset threshold of the RSCP, to the total measurement data number of the RSCP within the coverage optimization target region. Optionally, related information may be recorded in a 2-tuple manner, for example, {coverage measurement data number ratio, RSCP threshold}, where the "coverage measurement data number ratio" is a percentage ranging from 0 to 1, and the unit of the "RSCP threshold" is "dBm".

If the DL quality parameter is DL SINR, the coverage measurement data number ratio of the DL SINR equals a ratio of the total number of the measurement data, in each of which a measurement value of the SINR of a downlink reference signal is greater than or equal to a preset threshold of SINR, to the total measurement data number of the SINR within the coverage optimization target region. Optionally, related information may be recorded in a 2-tuple manner, for example, {coverage measurement data number ratio, SINR threshold}, where the "coverage measurement data number ratio" is a percentage ranging from 0 to 1, and the unit of the "SINR threshold" is "dB".

If the DL quality parameter is DL Ec/Io, the coverage measurement data number ratio of the DL Ec/Io equals a ratio of the total number of the measurement data, in each of which a measurement value of the Ec/Io of a downlink reference signal is greater than or equal to a preset threshold of Ec/Io, to the total measurement data number of the Ec/Io within the coverage optimization target region. Optionally, related information may be recorded in a 2-tuple manner, for example, {coverage measurement data number ratio, Ec/Io threshold}, where the "coverage measurement data number ratio" is a percentage ranging from 0 to 1, and the unit of the "Ec/Io threshold" is "dB".

33. Determine whether the actual value of the coverage measurement data number ratio is greater than or equal to the expected value of the coverage measurement data number ratio. If yes, execute 34; otherwise, execute 35.

34. Do not perform coverage optimization processing on the coverage optimization target region.

If the actual value of the coverage measurement data number ratio is greater than or equal to the expected value of the coverage measurement data number ratio, it indicates that the coverage optimization target region meets a coverage optimization requirement that is expected to be met. Therefore, the coverage optimization processing may not be performed on the coverage optimization target region.

35. Perform coverage optimization processing on the coverage optimization target region.

If the actual value of the coverage measurement data number ratio is smaller than the expected value of the coverage measurement data number ratio, it indicates that the coverage optimization target region does not meet a coverage optimization requirement that is expected to be met. Therefore, the coverage optimization processing needs to be performed on the coverage optimization target region.

Specific content of the coverage optimization processing performed on the coverage optimization target region is not limited. For example, an antenna direction, transmit power of the coverage optimization target region, and the like may be adjusted. In addition, a specific manner for performing the coverage optimization processing on the coverage optimization target region is not limited. For example, an adjustment may be performed manually, or a network may automatically perform optimization, and the like.

According to the management method for coverage optimization provided in this embodiment, the actual value of the coverage measurement data number ratio in the coverage optimization target region is determined according to the MDT or RLF measurement reports of the coverage optimization target region, the actual value of the coverage measurement data number ratio is compared with the expected value of the coverage measurement data number ratio, and whether the coverage optimization processing needs to be performed on the coverage optimization target region is determined according to the comparison result. As may be seen here, in this embodiment, automatic determination that whether the coverage optimization processing needs to be performed on the coverage optimization target region is implemented. This facilitates improvement of determination timeliness and accuracy, thereby improving management efficiency of coverage optimization.

Besides that coverage optimization management may be performed on the downlink, similarly, the coverage optimization management may be performed on an uplink. Specifically, an implementation method for the coverage optimization management in the uplink, where the coverage measurement data number ratio is used as the coverage optimization target, is similar to the management method for coverage optimization in the downlink. A difference lies in that an uplink quality parameter may accordingly include one or any combination of the following: UL RSRP, UL SINR, UL RSCP, and UL Ec/Io. The management method for coverage optimization in the uplink is not repeatedly described here.

Figure 4:
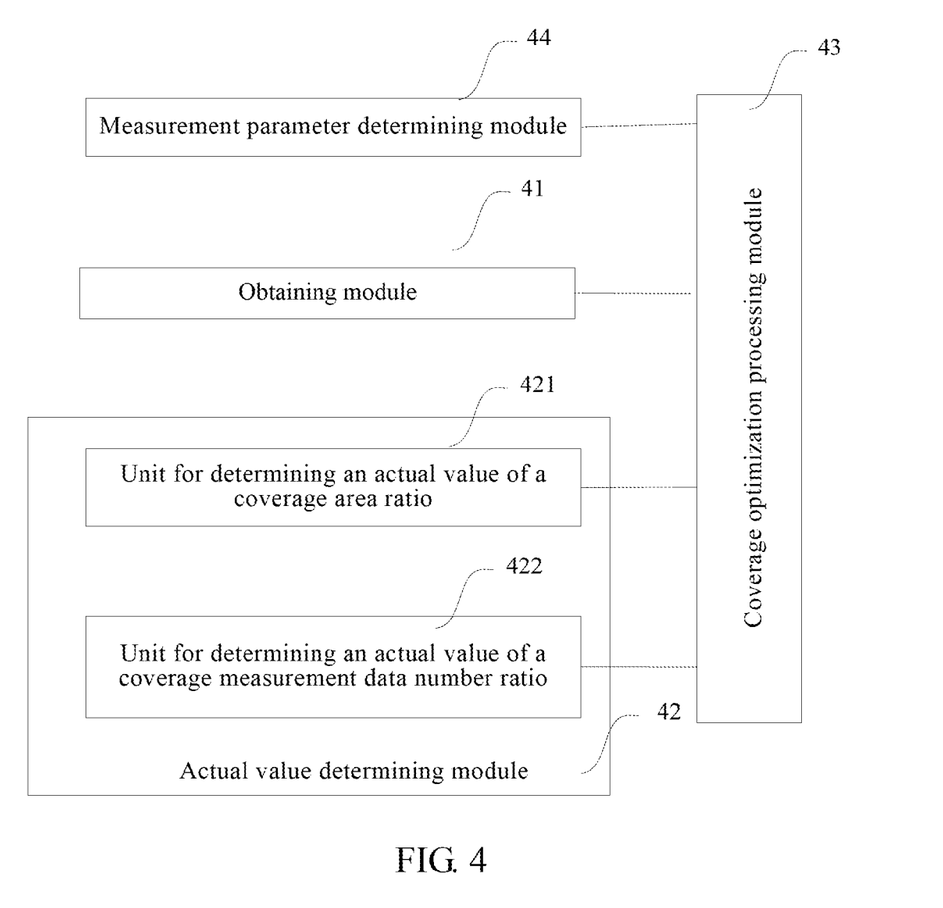
FIG. 4 is a schematic structural diagram of a management apparatus for coverage optimization according to a fourth embodiment of the present invention.

FIG. 4 is a schematic structural diagram of a management apparatus for coverage optimization according to a fourth embodiment of the present invention. The apparatus shown in FIG. 4 includes an obtaining module 41, an actual value determining module 42, and a coverage optimization processing module 43.

The obtaining module 41 may be configured to obtain measurement reports of a coverage optimization target region. The actual value determining module 42 may be configured to determine an actual value of a coverage optimization target within the coverage optimization target region according to the measurement reports of the coverage optimization target region. The coverage optimization processing module 43 may be configured to perform coverage optimization processing on the coverage optimization target region when the actual value of the coverage optimization target is smaller than a preset expected value of the coverage optimization target.

Optionally, the coverage optimization processing module 43 may further be configured not to perform coverage optimization processing on the coverage optimization target region when the actual value of the coverage optimization target is greater than or equal to the preset expected value of the coverage optimization target.

Optionally, the management apparatus for coverage optimization may further include a measurement parameter determining module 44. The measurement parameter determining module 44 may be configured to determine the coverage optimization target region and the expected value of the coverage optimization target. Further, the measurement parameter determining module 44 may specifically be configured to determine the coverage optimization target region and the expected value of the coverage optimization target according to a received northbound or southbound network management interface command message; or determine the coverage optimization target region and the expected value of the coverage optimization target according to a configuration parameter related to coverage optimization in a network resource model. The coverage optimization target region determined by the measurement parameter determining module 44 may include but is not limited to: a cell, a coverage region of a base station, a coverage region of a base station controller, or a coverage region of a subnetwork. The coverage optimization target determined by the measurement parameter determining module 44 may include but is not limited to: a coverage area ratio, and/or a coverage measurement data number ratio. The coverage area ratio is a ratio of a region area sum of regions within the coverage optimization target region to a total area of the coverage optimization target region, where a statistical average value of a link quality parameter of each of the regions reaches a preset threshold. The coverage measurement data number ratio is a ratio of a total number of measurement data, in each of which the statistical average value of the link quality parameter reaches the preset threshold, within the coverage optimization target region, to a total measurement data number of a measurement parameter within the coverage optimization target region. The link quality parameter includes: an uplink quality parameter, and/or a downlink quality parameter. The uplink quality parameter includes one or any combination of the following: uplink reference signal received power, an uplink reference signal to interference and noise ratio, uplink received signal code power, and an uplink received signal chip signal-to-noise ratio. The downlink quality parameter includes one or any combination of the following: downlink reference signal received power, downlink reference signal received quality, a downlink reference signal to interference and noise ratio, downlink received signal code power, and a downlink received signal chip signal-to-noise ratio.

Optionally, the actual value determining module 42 may include: a unit 421 for determining an actual value of the coverage area ratio, and/or a unit 422 for determining an actual value of the coverage measurement data number ratio.

The unit 421 for determining the actual value of the coverage area ratio may be configured to: divide the coverage optimization target region into multiple grid regions; establish a mapping between a related measurement value of the link quality parameter in the measurement reports and a grid region; determine, according to the mapping, the statistical average value of the link quality parameter within a preset time period of any one of the gird regions; determine grid regions, in each of which the statistical average value is greater than or equal to the preset threshold of the link quality parameter, and calculate the region area sum of the determined grid regions; and use the ratio of the region area sum to the total area of the coverage optimization target region as an actual value of the coverage area ratio.

The unit 422 for determining the actual value of the coverage measurement data number ratio may be configured to: determine, in the measurement reports of the coverage optimization target region within the preset time period, the total measurement data number of the link quality parameter and the total number of measurement data, in each of which a measurement value is greater than or equal to the preset threshold of the downlink quality parameter; and use a ratio of the total number of the measurement data to the total measurement data number as the actual value of the coverage measurement data number ratio.

According to the management apparatus for coverage optimization provided in this embodiment, the actual value of the coverage optimization target within the coverage optimization target region is determined according to the measurement reports of the coverage optimization target region, the actual value of the coverage optimization target is compared with the expected value of the coverage optimization target, and whether the coverage optimization processing needs to be performed on the coverage optimization target region is determined according to the comparison result. As may be seen here, in this embodiment, automatic determination that whether the coverage optimization processing needs to be performed on the coverage optimization target region is implemented. This facilitates improvement of determination timeliness and accuracy, thereby improving management efficiency of coverage optimization.

A presentation entity of the management apparatus for coverage optimization provided in this embodiment is not limited. For example, the management apparatus for coverage optimization may be: an NMS, an EMS, a base station, another network element device except the base station, or the like. For the working mechanism of the management apparatus for coverage optimization provided in this embodiment, reference may be made to the description of embodiments corresponding to FIG. 1, FIG. 2, and FIG. 3, which is not repeatedly described here.

An embodiment of the present invention further provides a management system for coverage optimization. The system includes at least a management apparatus for coverage optimization. For the structure of the management apparatus for coverage optimization, reference may be made to the description of the embodiment corresponding to FIG. 4, and for the working mechanism and achievable technical effect of it, reference may be made to the description of the embodiments corresponding to FIG. 1, FIG. 2, and FIG. 3, which are not repeatedly described here.

Persons of ordinary skill in the art may understand that the accompanying drawings are merely schematic diagrams of an embodiment, and modules or processes in the accompanying drawings are not necessarily required for implementing the present invention.

Persons of ordinary skill in the art may understand that modules in the apparatus provided in the embodiment may be distributed in the apparatus of the embodiment according to the description of the embodiment, or may be located in one or more apparatuses which are different from that described in the embodiments. The modules according to the foregoing embodiments may be combined into one module, or split into multiple submodules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent substitutions to some technical features in it, and such modifications or substitutions do not make the nature of related technical solutions depart from the scope of the technical solutions of the embodiments of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A management method for coverage optimization, the method comprising:
obtaining, by a management apparatus for coverage optimization, measurement reports of a coverage optimization target region;
determining, by the management apparatus for coverage optimization, an actual value of a coverage optimization target within the coverage optimization target region according to the measurement reports; and
performing, by the management apparatus for coverage optimization, coverage optimization processing on the coverage optimization target region when the actual value of the coverage optimization target is smaller than a preset expected value of the coverage optimization target;
wherein the coverage optimization target is one or more of a coverage area ratio and a coverage measurement data number ratio;
wherein the coverage area ratio is a ratio of a sum of areas of regions that are within the coverage optimization target region and that each have a statistical average value of a link quality parameter that reaches a preset threshold to a total area of the coverage optimization target region; and
wherein the coverage measurement data number ratio is a ratio of a number of measurement data points that are taken for a measurement parameter within the coverage optimization target region and that have a statistical average value of the link quality parameter that reaches a preset threshold to a total number of measurement data points taken for the measurement parameter within the coverage optimization target region.

2. The method according to claim 1, wherein the coverage optimization target region comprises a cell, a coverage region of a base station, a coverage region of a base station controller, or a coverage region of a subnetwork.

3. The method according to claim 1,
wherein the link quality parameter comprises at least one of an uplink quality parameter and a downlink quality parameter.

4. The method according to claim 3, wherein the uplink quality parameter comprises one or any combination of the following uplink reference signal received power, an uplink reference signal to interference and noise ratio, uplink received signal code power, and an uplink received signal chip signal-to-noise ratio.

5. The method according to claim 3, wherein the downlink quality parameter comprises one or any combination of the following downlink reference signal received power, downlink reference signal received quality, a downlink reference signal to interference and noise ratio, downlink received signal code power, and a downlink received signal chip signal-to-noise ratio.

6. The method according to claim 3, wherein the determining, according to the measurement reports, an actual value of a coverage optimization target within the coverage optimization target region comprises:
dividing the coverage optimization target region into multiple grid regions;
establishing a mapping between a related measurement value of the link quality parameter in the measurement reports and a grid region;
determining, according to the mapping, the statistical average value of the link quality parameter within a preset time period of any one of the grid regions;
determining grid regions, in each of which the statistical average value is greater than or equal to the preset threshold of the link quality parameter, and calculating the region area sum of the determined grid regions; and
using a ratio of the region area sum to the total area of the coverage optimization target region as an actual value of the coverage area ratio.

7. The method according to claim 3, wherein the determining, according to the measurement reports, an actual value of a coverage optimization target within the coverage optimization target region comprises:

determining, from the measurement reports of the coverage optimization target region within a preset time period, the total number of measurement data points taken for the link quality parameter within the coverage optimization target region and the number of measurement data points that are taken for the measurement parameter within the coverage optimization target region and that have a measurement value that is greater than or equal to the preset threshold of the link quality parameter; and using a ratio of the number of measurement data points that are taken for the measurement parameter within the coverage optimization target region and that have the measurement value that is greater than or equal to the preset threshold of the link quality parameter to the total number of measurement data points taken for the link quality parameter within the coverage optimization target region as an actual value of the coverage measurement data number ratio.

8. The method according to claim 1, wherein the measurement reports comprise minimization of drive test reports or radio link failure measurement reports.

9. The method according to claim 1, further comprising: determining the coverage optimization target region and the expected value of the coverage optimization target.

10. The method according to claim 9, wherein the determining the coverage optimization target region and the expected value of the coverage optimization target comprises:

determining, according to a received northbound or southbound network management interface command message, the coverage optimization target region and the expected value of the coverage optimization target.

11. The method according to claim 9, wherein the determining the coverage optimization target region and the expected value of the coverage optimization target comprises:

determining, according to a configuration parameter related to coverage optimization in a network resource model, the coverage optimization target region and the expected value of the coverage optimization target.

12. A management apparatus for coverage optimization, comprising:

a computer including a non-transitory computer-readable medium storing program modules executable by the computer, the modules including:
an obtaining module configured to obtain measurement reports of a coverage optimization target region;
an actual value determining module configured to determine an actual value of a coverage optimization target within the coverage optimization target region according to the measurement reports; and
a coverage optimization processing module configured to perform coverage optimization processing on the coverage optimization target region when the actual value of the coverage optimization target is smaller than a preset expected value of the coverage optimization target;
wherein the coverage optimization target is one or more of a coverage area ratio and a coverage measurement data number ratio;
wherein the coverage area ratio is a ratio of a sum of areas of regions that are within the coverage optimization target region and that each have a statistical average value of a link quality parameter that reaches a preset threshold to a total area of the coverage optimization target region; and
wherein the coverage measurement data number ratio is a ratio of a number of measurement data points that are taken for a measurement parameter within the coverage optimization target region and that have a statistical average value of the link quality parameter that reaches a preset threshold to a total number of measurement data points taken for the measurement parameter within the coverage optimization target region.

13. The apparatus according to claim 12, wherein the link quality parameter comprises at least one of an uplink quality parameter and a downlink quality parameter.

14. The apparatus according to claim 13, wherein the actual value determining module comprises at least one of a unit for determining an actual value of the coverage area ratio and a unit for determining an actual value of the coverage measurement data number ratio;

wherein the unit for determining the actual value of the coverage area ratio is configured to:
divide the coverage optimization target region into multiple grid regions;
establish a mapping between a related measurement value of the link quality parameter in the measurement reports and a grid region; determine, according to the mapping, the statistical average value of the link quality parameter within a preset time period of any one of the grid regions;
determine grid regions, in each of which the statistical average value is greater than or equal to the preset threshold of the link quality parameter, and calculate the sum of the areas of the determined grid regions; and
use the ratio of the sum of the areas of the determined grid regions to the total area of the coverage optimization target region as an actual value of the coverage area ratio;

wherein the unit for determining the actual value of the coverage measurement data number ratio is configured to:
determine, from the measurement reports of the coverage optimization target region within a preset time period, the total number of measurement data points taken for the link quality parameter within the coverage optimization target region and the number of measurement data points that are taken for a measurement parameter within the coverage optimization target region and that have a statistical average value greater than or equal to the preset threshold of the link quality parameter; and
use a ratio of the number of measurement data points that are taken for a measurement parameter within the coverage optimization target region and that have a statistical average value greater than or equal to the preset threshold of the link quality parameter to the total number of measurement data points taken for the link quality parameter within the coverage optimization target region as the actual value of the coverage measurement data number ratio; and
wherein the link quality parameter comprises at least one of an uplink quality parameter and a downlink quality parameter.

15. The apparatus according to claim 13, wherein the module further include a measurement parameter determining module configured to determine the coverage optimization target region and the expected value of the coverage optimization target.

16. The apparatus according to claim 15, wherein the measurement parameter determining module is configured to determine the coverage optimization target region and the expected value of the coverage optimization target according to a received northbound or southbound network management interface command message.

17. The apparatus according to claim 15, wherein the measurement parameter determining module is configured to determine the coverage optimization target region and the expected value of the coverage optimization target according to a configuration parameter related to coverage optimization in a network resource model.

* * * * *